Patented Oct. 29, 1946

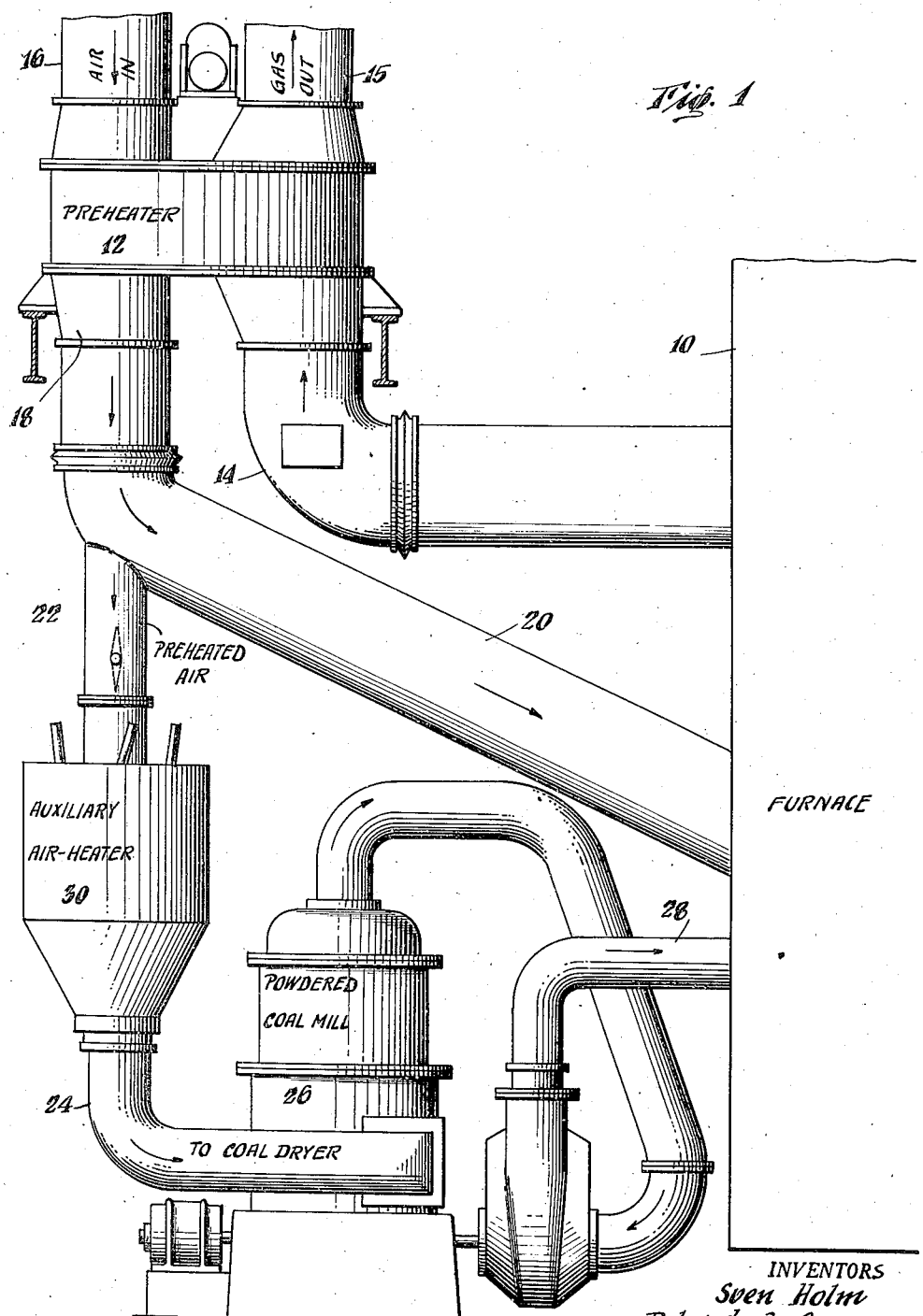

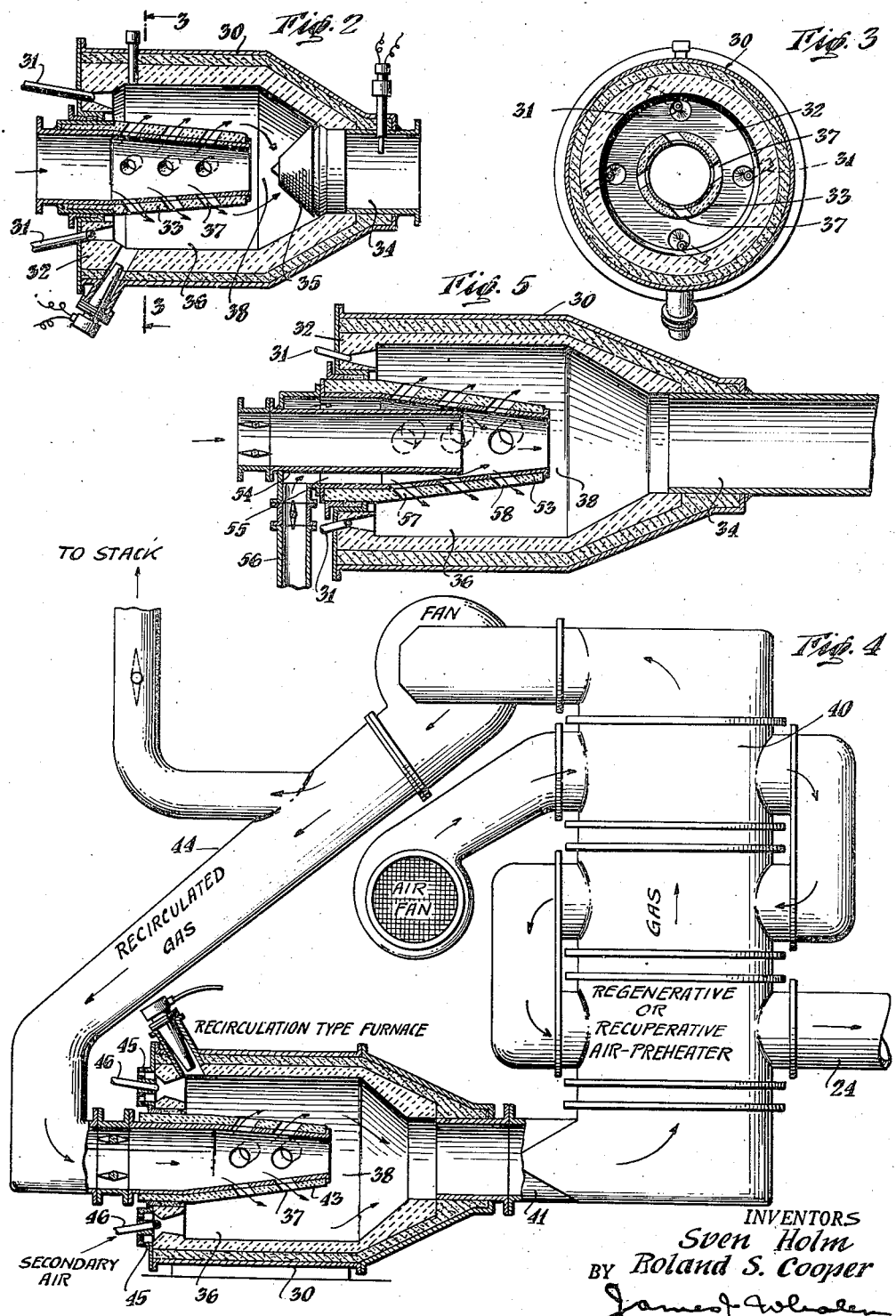

2,410,337

UNITED STATES PATENT OFFICE 2,410,337

AIR PREHEATER FOR PULVERIZING MILLS

Roland S. Cooper, River Forest, Ill., and Sven Holm, Wellsville, N. Y., assignors to The Air Preheater Corporation, New York, N. Y.

Original application October 22, 1942, Serial No. 462,942. Divided and this application April 21, 1944, Serial No. 532,124

2 Claims. (Cl. 263—19)

The present invention relates to heat exchange apparatus and particularly to air preheaters associated with boiler furnaces or the like in which pulverized fuel is burned.

There are numerous instances in which the waste gases from a boiler are passed through an air preheater to preheat the "secondary air" for combustion of pulverized fuel in the boiler furnace and also to supply "primary air" to a fuel pulverizing mill for drying the coal therein. However, with coals of high moisture content mined in certain parts of the country the proper drying of pulverized coal requires primary air that has been preheated to a higher temperature than that available or desired for the secondary air used for the combustion of the fuel. In accordance with the present invention air that has been preheated in a conventional air preheater to the maximum temperature obtainable by transfer of heat from waste gases is further heated by being passed through a separately fired auxiliary heater before reaching the pulverizing mill.

The invention will be best understood upon consideration of the following detailed description of an illustrative embodiment thereof when read in conjunction with the accompanying drawings in which:

Figure 1 is a schematic view of an air preheating system supplying secondary air to a boiler furnace for the combustion of fuel therein and supplying primary air for drying the pulverized fuel burned in the furnace in accordance with the present invention.

Figure 2 is a longitudinal sectional view of the separately fired auxiliary air heater illustrated in Fig. 1;

Figure 3 is a sectional view on the line 3—3 in Fig. 2;

Figure 4 shows an air heater like that in Fig. 2 arranged for recirculation of the gases of combustion therefrom; and Figure 5 illustrates a modified form of the air heater shown in Fig. 4.

Referring first to Figure 1, waste gases as from a boiler 10 pass through the gas side of a Ljungstrom preheater 12 on their way from the boiler offtake 14 to the flue 15. Air supplied by a fan, not shown, entering the inlet duct 16 traverses the air side of the preheater 12 and from its outlet 18 flows via a duct 20 to the furnace of the boiler 10 where the preheated air is utilized in the combustion of the fuel. Part of the preheated air flows from the air preheater 12 by way of a branch duct 22—24 to a coal drying and pulverizing mill 26 from which a stream of pulverized coal and primary air is directed to the fuel burners by a duct 28.

As mentioned, because the amount of available heat that may be transferred from the waste heat gases in boiler offtake duct 14 is oftentimes not great enough to heat the air flowing through preheater 12 into the air outlet duct 20 to a temperature sufficiently high for properly drying coal of high moisture content; therefore a separately fired auxiliary air heater 30 is interposed in the ducts 22—24 between the air outlet of the preheater 12 and the inlet to the coal drying and pulverizing mill 26. The separately fired air heater shown in Fig. 2 consists of a generally cylindrical furnace 30 having a number of liquid or gaseous fuel burners 31 arranged in a circle and projecting through one end wall 32. Chamber 30 tapers at its other end for connection to the duct 24. The duct 22 through which preheated air is taken from the main air preheater 12 is connected to a tube 33 projecting through the end wall 32 and extending axially of the furnace 30 to a point adjacent but short of its outlet opening 34 which is screened by a fire check 35. The burners 31 for injecting the fuel into the furnace 30 are arranged in a circle about tube 33 and set at an angle with respect to the longitudinal axis of chamber 30 so as to give a tangential firing effect as is shown in Fig. 3. As the preheated air from duct 22 enters the tube 33 the portion of the air necessary for combustion of fuel flows into the annular furnace space 36 about the tube 33 through a number of holes 37 in the wall of the latter. These holes are arranged at such an angle that the air enters the furnace chamber 36 tangentially and in opposite direction to the jets of fuel from the burners 31. This results in good mixing of the fuel with the air discharged from openings 37. The portion of the air not used for combustion is discharged from the end of the air tube 33 and heated by mixing with the products of combustion in a chamber 38 beyond the end of tube 33.

With the arrangement described, there is good utilization of the combustion space because the annular combustion chamber formed between the inner wall of the cylindrical furnace 30 and the tapering outside surface of tube 33 enlarges from the point of fuel injection toward the outlet of the furnace thereby increasing the volume of the combustion chamber as the gases expand in the process of combustion. With the combustion zone on the outside of tube 33 and a cooler zone in the center, radiation into the discharge duct is considerably reduced thereby eliminating the necessity of baffling.

In the arrangement shown in Fig. 4, the air passing to the pulverizing mill through the duct 24 is heated to the required temperature in an air heater 40 receiving its heating gases through a duct 41 from the outlet of the furnace 30 and discharging them back into the center tube 43 of the latter through a duct 44. The secondary air required for combustion of the fuel in this arrangement is introduced at 45 around the burners 46. In another form as shown in Fig. 5 the recirculated gases are introduced into the center tube 53 through a pipe 54 which is of smaller diameter so that a space 55 is formed around the pipe 54 to which the required secondary air may be supplied through a connection 56. In this form openings 57 and 58, like the openings 37 in Fig. 2 are provided for injecting the secondary air and some of the recirculated gases into the combustion space 36 about the tube 53.

This is a divisional application of that filed on October 22, 1942, under Serial No. 462,942.

We claim:

1. A furnace for heating gaseous fluids comprising; means forming an elongated cylindrical furnace chamber closed at one end; a gas discharge duct connected centrally into the opposite end of said chamber; burners disposed for introducing fuel to be burned to said chamber through its wall near said one end and arranged in a circle to direct the fuel streams toward and tangentially to an imaginary circle centered on the longitudinal axis of said chamber and located in a plane transverse thereof; an air tube projecting through said one end wall within said burner circle and having an open end located at a point short of the opposite end wall, said tube being of smaller diameter than the cross sectional area of said chamber to provide an annular combustion space and being formed in its side wall with orifices inclined with respect to the axis of said chamber so as to direct air into said annular combustion space in directions opposite to those of the streams of fuel from said burners.

2. A furnace construction as recited in Claim 1 wherein exterior wall of said air tube tapers toward said outlet duct so that said annular combustion space surrounding it increases in volume in the direction of gas flow.

ROLAND S. COOPER.
SVEN HOLM.